May 19, 1953　　　O. E. SEEBURG　　　2,638,699
FISHING LEADER KIT
Filed Aug. 1, 1951
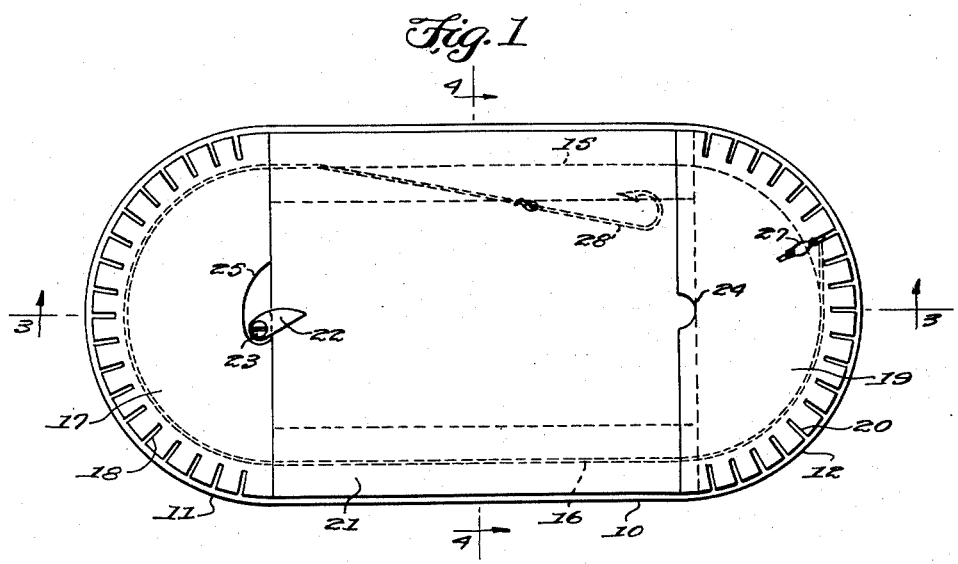
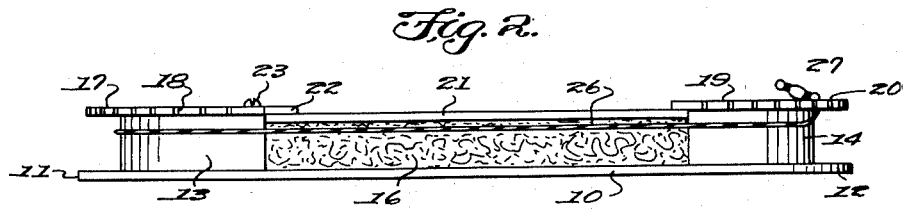
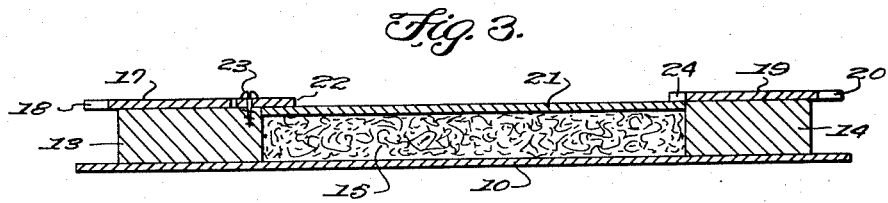
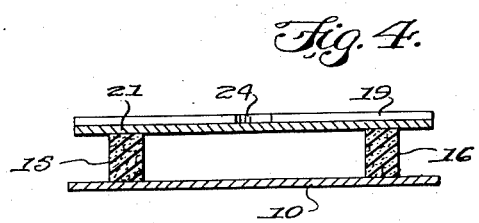
INVENTOR.
Oscar E. Seeburg,
BY Victor J. Evans & Co.
ATTORNEYS Patented May 19, 1953

2,638,699

UNITED STATES PATENT OFFICE 2,638,699

FISHING LEADER KIT

Oscar E. Seeburg, Nokomis, Fla.

Application August 1, 1951, Serial No. 239,750

3 Claims. (Cl. 43—57.5)

This invention relates to fishing tackle and particularly to devices for storing and carrying parts of fishing tackle, and in particular a device for holding leaders of fish hooks whereby each leader is retained in a stretched position and in which the leaders are separated so that any leader desired may be removed, used, and replaced without disturbing the other leaders in the kit.

The purpose of this invention is to eliminate tangled and kinked leaders and to facilitate carrying leaders of fishing hooks whereby the fishing hooks and leaders are always in position ready for use.

In the conventional manner of coiling a leader with a fish hook thereon or wrapping the leader around an object so that it can be placed in a fishing tackle box, leaders spring from the coils or mounting elements and not only become tangled in the tackle box but are difficult to locate, and with the leaders dropped into a fishing tackle box it is also difficult to select the leader desired. With this thought in mind this invention contemplates a leader holder in the form of a spool in which this spool is split longitudinally and spaced with rubber strips providing sides and wherein flanges at the ends of the spool are replaced by elongated side plates with notches in the edges.

The object of this invention is, therefore, to provide means for forming a fishing leader kit wherein leaders are retained in spaced relation and also stretched.

Another object of the invention is to provide a leader kit that may readily be carried in a pocket or in a tackle box as may be desired.

A further object of the invention is to provide a fishing leader kit which is of a simple and economical construction.

With these and other objects and advantages in view the invention embodies a comparatively small flat box having substantially semi-circular ends with side plates extended at the edges and having notches therein, with side walls formed of rubber strips and with a cover plate positioned in one of the sides and secured in position with a latch.

Other features and advantages of the invention will appear from the following description taken in connection with the drawings wherein:

Figure 1 is a plan view showing a leader kit with a leader having a fish hook thereon positioned in the kit.

Figure 2 is a side elevational view of the kit as shown in Fig. 1.

Figure 3 is a longitudinal section through the kit taken on line 3—3 of Fig. 1.

Figure 4 is a cross section through the kit taken on line 4—4 of Fig. 1.

Referring now to the drawings, wherein like reference characters denote corresponding parts, the leader kit of this invention includes a base plate 10 having semi-circular ends 11 and 12, blocks 13 and 14 positioned on the plate 10 and having substantially semi-circular outer surfaces, rubber strips 15 and 16 providing side walls of the kit and positioned between the blocks 13 and 14, a segment 17 having notches 18 in the edge positioned on the block 13, a similar segment 19 having notches 20 in the edge positioned on the block 14 and a cover plate 21 extended under the edges of the segments 17 and 19 and which is secured in position by a latch 22 mounted on the block 13 with a screw 23.

The blocks 13 and 14 are secured to the base, and the segments 17 and 19 to the blocks 13 and 14 by adhesive or other suitable means.

The segment 19 is provided with a recess 24 and an enlarged recess 25 is provided in the inner edge of the segment 17 so that the latch 22 can be turned to a position therein to facilitate removing the cover plate 21.

With the parts arranged in this manner a leader, as indicated by the numeral 26 and having a swivel or connection 27 thereon is positioned with the swivel in one of the notches of the segment 19; and with the leader wrapped around the outer surfaces of the blocks, the fish hook 28 on the opposite end of the leader is passed over and then hooked into the rubber strip 15 which may be of sponge rubber or other suitable material. By this means the leader is retained stretched and with the connectors of different leaders positioned in different notches leaders may be retained in spaced relation whereby a dsired leader may be selected, withdrawn and usd and may also be replaced after use without disturbing other leaders on the kit.

It will be understood that modifications may be made in the design and arrangement of the parts without departing from the spirit of the invention.

What is claimed is:

1. A leader kit comprising spaced parallel side plates having extended edges with spaced notches in the edges of one of said plates, spacing elements partitioned between the ends of the side plates, and resilient strips positioned between the side plates and spacing elements for receiving the points of fishing hooks.

2. A fishing leader kit comprising spaced parallel side plates having semi-circular ends and having spaced notches in the edges, spacing elements having semi-circular outer surfaces positioned between the ends of the side plates, spaced resilient strips mounted on one of said side plates positioned between the said spacing elements, and a cover plate positioned intermediately of the said side plates.

3. In a fishing leader kit, the combination which comprises an elongated base plate having semi-circular ends, spacing blocks having flat inner surfaces with semi-circular outer surfaces positioned on said base plate with the flat inner surfaces in spaced relation, resilient strips also positioned on the base plate and extended from one of said spacing blocks to the other providing side walls, a cover plate positioned on said resilient strips with one of the edges thereof extended under the inner edge of one of said blades, and a latch pivotally mounted on one of said spacing blocks to retain the cover plate in position on the kit.

OSCAR E. SEEBURG.

References Cited in the file of this patent

UNITED STATES PATENTS

| Number | Name | Date |
| --- | --- | --- |
| 1,516,522 | Farr | Nov. 25, 1924 |
| 2,559,780 | Martinson | July 10, 1951 |

FOREIGN PATENTS

| Number | Country | Date |
| --- | --- | --- |
| 753,768 | France | Aug. 1933 |